July 3, 1923.

L. W. TIFFANY

LEVEL ATTACHMENT

Filed Nov. 8, 1921

1,460,989

WITNESSES
Edw. Thorpe

INVENTOR
L. W. Tiffany
BY
ATTORNEYS

Patented July 3, 1923.

1,460,989

UNITED STATES PATENT OFFICE.

LEVERETT W. TIFFANY, OF WINSTED, CONNECTICUT.

LEVEL ATTACHMENT.

Application filed November 8, 1921. Serial No. 513,674.

*To all whom it may concern:*

Be it known that I, LEVERETT W. TIFFANY, a citizen of the United States, and resident of Winsted, in the county of Litchfield and State of Connecticut, have invented a new and Improved Level Attachment, of which the following is a full, clear, and exact description.

My invention relates to an attachment and aims to provide an attachment of this nature suitably utilized in connection with levels such as are used by carpenters, and other mechanics.

It is a well appreciated fact in connection with the use of levels, that it is extremely difficult to accurately determine the height, or a distance in a given plane between one point and a second point. In other words, assuming that one point in a surface, through error on the part of the workman, lies in a different plane than at another point, or it is deliberately intended to have one point in a surface in a different plane beyond the plane in which a second point in the surface lies, great difficulty is experienced by a mechanic in accurately determining the distance between these planes.

Thus it is an object of the present invention to provide an attachment for a level, of any desired character, by means of which it will be possible to accomplish this result without the necessity of utilizing the services of an experienced engineer for performing this test.

A further object of this invention is the construction of a device of the nature stated which may be provided for a relatively nominal sum, and by means of which the calculation aforementioned may be quickly accomplished.

Still further objects of this invention will become apparent in the annexed specification taken in connection with the drawings, which latter illustrate one practical embodiment of the same, and in which.

Figure 1:
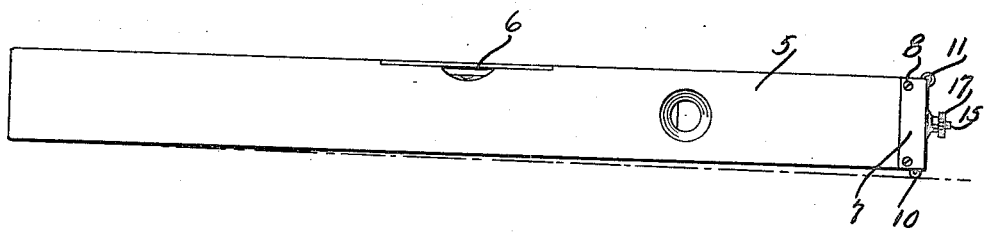
Figure 1 is a side view of a level of a conventional design, having my improved attachment associated therewith.
Figure 2:
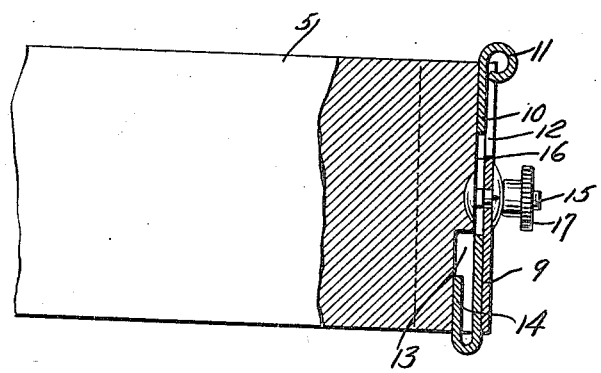
Figure 2 is a fragmentary enlarged partly sectional view of the end portion of said level and showing my attachment associated therewith.
Figure 3:
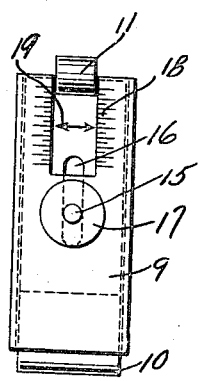
Figure 3 is an end view of said level.

Referring now more particularly to Figures 1 and 2 it will be seen that the reference numeral 5 indicates a level of any desirable type, and material, with which the usual indicating elements 6 are associated, it being noted, that in the embodiment illustrated. I have shown my attachment associated with merely one end of the body of said level.

Referring to the detailed construction of this attachment it will be seen that the same preferably includes a U-shaped plate 7 partly enveloping one end of the body of the lever 5 to which it is attached by any suitable means such as screws 8.

However, it will be seen, as in Figure 2, that the base or exterior portion 9 of the said plate 7 is spaced from the end of the level 5 so that a slide 10 may be removably disposed within this space.

With a view of properly housing this slide in this position, it will be noted that a portion of the upper end of the same is preferably beaded as at 11, and this portion extends through a slot 12 in the base 9 of the plate 7 and serves as a finger engageable portion by means of which the slide 10 may be deliberately moved. Also the body 5 is preferably formed with a cutout part 13 adjacent its lower outer edge and by bending the lower end of the slide as at 14, a shoe is provided which may bear against the supporting surface the inner edge of this shoe co-operating with the cutout portion 13 to act as a stop thus limiting the movement of the said slide.

Thus the downward movement of the slide beyond a certain point is prevented by a co-operation of the body portion 11 with the base of the slot 12, while an extreme movement in an opposite direction is precluded by means of the bent portion 14, and finally to provide means which will serve to clamp the slide with respect to the plate it will be noted that I preferably utilize a bolt 15 which is affixed to the plate 7 and extends through a slot 16 in the slide 10. Thus upon the nut 17 carried by the bolt 15 being tightened the plate and slide will be clamped one to the other to accomplish the result desired.

In operation it will be appreciated, that as has been shown in Figure 1, assuming that a measurement of an inclined surface is to be made, that an operator will position the level in the usual manner subsequent to which he will raise the lowermost end of the same (with which the attachment is associated) to a point at which the device will indicate that the body of the level lies in a true horizontal plane. Simultaneously with this operation he will project the slide 10 until the shoe or lower portion of the same rests upon the supporting surface, as has also been shown in Figure 1.

When this adjustment of the parts has been achieved a tightening of the nut 17 will serve to retain these parts immovable with respect to each other, and the operator may then determine the degree of inclination and the distance between the two planes in which the inner and outer end of the level rests by glancing at the graduations 18 of the plate 7 and more particularly the graduation with which the indicating mark 19 of the slide 10 aligns.

Thus all of the objects set forth in the preamble of this specification have been accomplished, and it will be appreciated that numerous modifications of structure might readily be resorted to without in the least departing from the scope of my claims; which are—

1. A level attachment including in combination with the body of a level formed with a cutout portion adjacent its lower outer edge, of a U-shaped plate secured to said body, the base of said plate being spaced from the end portion of said body, a slide movably interposed between said plate and body, there being enlarged portions forming a part of the upper edge of said slide and being adapted to extend into a slot formed in the upper edge of said plate, an upturned portion forming a part of the lower end of said slide, said upturned portion being adapted to extend into the cutout portion of said body, a screw threaded bolt secured to said plate, and extending through a slot formed in said slide, and a nut carried by said bolt at a point beyond said plate.

2. A level attachment including a plate having a longitudinally extending slot, and a slide carried by and movable lengthwise of said plate, and having a bead formed at one end of said slide and adapted to extend through the slot formed in said plate.

3. A level attachment including a U shaped plate, a slide formed with a slot, a bead formed at the upper edge of said slide, a shoe formed at the lowermost portion of said slide, fastening means extending through the slot of said slide, said fastening means being adapted to be secured to said plate, the beaded portion of said slide extending into a slot formed in the upper edge of said plate.

LEVERETT W. TIFFANY.